Oct. 21, 1924.
1,512,164
E. O'N. FOWLER
RESILIENT TIRE
Filed Oct. 22, 1923
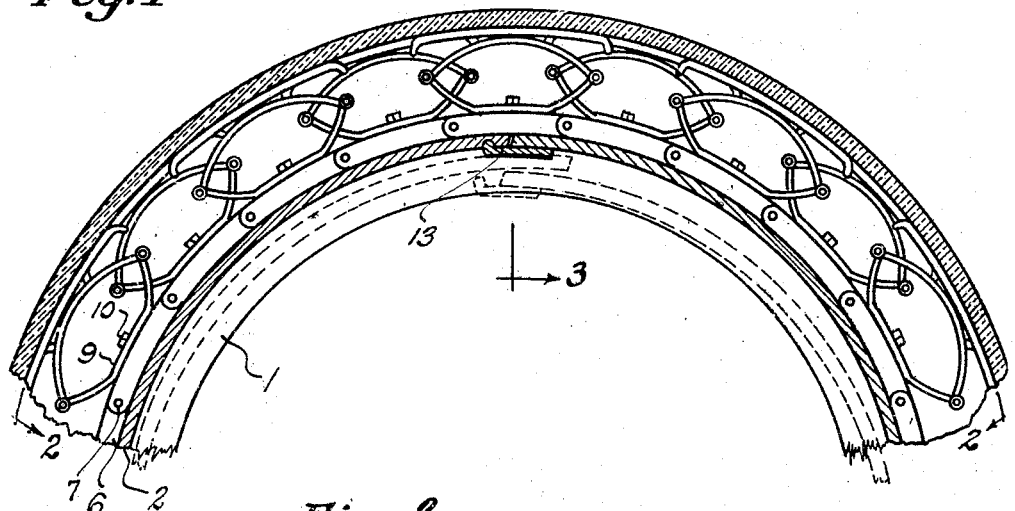
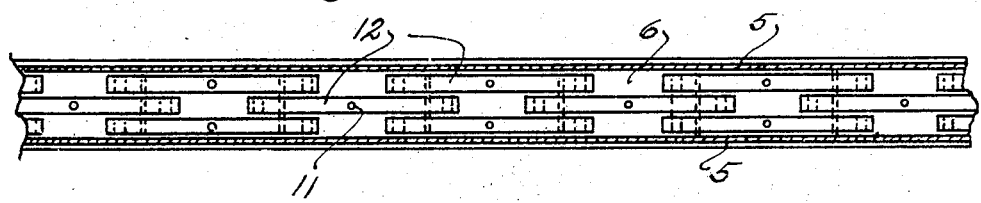
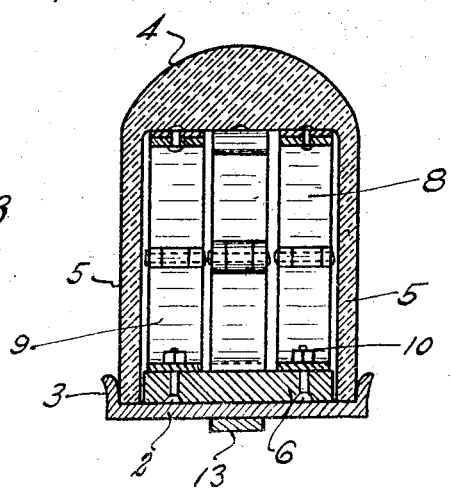
Inventor
E. O'N. FOWLER
Attorney Patented Oct. 21, 1924.

1,512,164

UNITED STATES PATENT OFFICE.

EGBERT O'NEAL FOWLER, OF BIRMINGHAM, ALABAMA.

RESILIENT TIRE.

Application filed October 22, 1923. Serial No. 669,966.

*To all whom it may concern:*

Be it known that I, EGBERT O'NEAL FOWLER, a citizen of the United States of America, residing at Birmingham, in the county of Jefferson and State of Alabama, have invented certain new and useful Improvements in Resilient Tires, of which the following is a specification.

My invention relates to a resilient tire for automobiles in which a flexible resilient annulus is mounted within a tire casing which is similar to those adapted to receive a pneumatic inner tube.

More particularly my invention resides in the novel construction of the resilient spring annulus and in the manner of mounting the same and the tire casing on the wheel rim, and particularly my invention is concerned with the manner in which the spring elements of the annulus are, in a simple and effective manner, brought under initial compression when mounted on the wheel so that they will function like an inflated pneumatic tube to absorb the shocks to which the tire is subjected.

My invention also relates to the formation of linked bases for the support of the spring elements, these elements being mounted in staggered relation and preferably provided with top spring extensions adapted practically to close the gaps between the spring elements so as to afford an effective and substantially continuous support throughout for the tread of the tire casing.

My invention also comprises the novel details of construction and arrangements of parts, which in their preferred embodiment only are illustrated in the accompanying drawings, in which:—

Fig. 1 is a partial cross-sectional view taken at right angles to the wheel axis showing in side elevation a portion of the spring annulus with its spring elements under compression in operating position, the dotted lines showing the contracted split rim before it is expanded to bring the spring elements of the annulus under compression.

Fig. 2 is a cross-sectional view taken on the circumferential line 2—2 of Fig. 1, showing the spring annulus in plan.

Fig. 3 is an enlarged cross-sectional view taken on the line 3—3 of Fig. 1.

Similar reference numerals refer to similar parts throughout the drawings.

In the embodiment of my invention illustrated, I show a wheel felly 1 having a split rim 2 which is adapted, when expanded, to be mounted on the felly and having side flanges or beads 3 to retain in operating position thereon a tire casing having a tread 4 and approximately straight side walls 5 which receive between them arcuate spring supporting bases 6 that rest on the rim 2 and conform substantially to its curvature. These bases 6 are hingedly connected by hinge pins 7 so as to form a flexible annulus or chain support for spring elements such as 8 which are adapted to support the tire casing. The spring elements illustrated are of the elliptical leaf type, the middle portion of the base of each inner leaf being made concave at 9 to conform to the convex outer surface of its respective base to which it is connected by one or more bolts 10 that have their heads countersunk in the bottom face of their respective bases. The outer leaf of each spring 8 has suitably attached thereto, by a rivet or screw 11, a spring bridge 12 which is struck on a curve corresponding to the curvature of the inner surface of the casing tread 4 and which overhangs practically the full length of the elliptical spring. The springs as thus made up are assembled so that they form three annular series surrounding the resilient annulus, the units of the two outer series standing in transverse alignment and the units of the middle series being staggered relatively to the units of the outer two series. In this way the bridge members 12 afford almost a continuous support for the tire casing tread and thus practically eliminates the wide gaps that would exist between the ends of adjacent elliptic springs in each series. Preferably the tire bases 6 are of relatively small length, say one inch each, so that one or more can be taken out or added to bring the length of the annulus of bases to conform to the rim on which it is to be mounted. As illustrated, the bases alternately carry the single and double springs.

The split tire rim 2 is of any standard type and is provided with the customary clasp or lock lugs 13 to hold its ends in engagement when the rim has been expanded and its ends brought into abutting relation. One of the most important features of my invention relates to the manner in which the resilient tire is assembled and its spring units are brought under the requisite initial compression. This is accomplished as follows. The spring annulus is free to be folded or broken in so that it can be inserted readily in the tire casing and when first inserted therein the bases 6 will project substantially towards the wheel center from the inner peripheries of the sides 5 of the casing. The rim 2 in collapsed position is now inserted within the spring annulus and suitable tire appliances are now utilized to bring about an expansion of the split rim and with it the compression of the individual springs 8 against the casing tread until when the ends of the rim are ready to be locked in abutting position the several springs 8 throughout the spring annulus have all been brought under the desired compression. When the rim is locked in expanded position the resilient tire is ready for service and the several spring units are of such character and are so designed that under the tension to which they are brought by the expansion of the rim they will support the tire casing yieldingly so as to give the effect of an easy riding pneumatic tire.

The type of spring elements selected is the one I consider best suited to my purposes, but it is to be understood that the detail structure of the springs and their bases can be varied to suit the different conditions of service without departing from the substance of my invention.

Having thus described my invention, what I claim as new and desire to secure by Letters Patent, is:—

1. A demountable resilient annulus for use in tire casings to form a resilient tire, comprising spring bearing elements hingedly connected to form an annulus, springs mounted on said elements and adapted to be brought under initial compression when the annulus is forced into operating position between the tire casing and rim.

2. A demountable resilient annulus, as described in claim 1, in which the spring bearing elements form inner bases which support the springs, and the springs carry tread supporting bridge members on their outer ends.

3. In combination, a split tire rim, a flexible spring annulus comprising springs and spring supports adapted to fit the expanded rim, said annulus being adapted to be received in a tire casing, and a tire casing having a tread of less internal diameter than the outer diameter of the spring annulus when the springs thereof are not under compression.

4. In combination, a split rim adapted to be expanded into operating position, a spring annulus comprising hingedly connected spring bases adapted to fit the expanded rim, springs mounted on said bases, and a tire casing adapted to receive the annulus before it is mounted on the tire rim and having an inner tread diameter less than the diameter of the outer periphery of the springs when not under compression.

In testimony whereof I affix my signature.

EGBERT O'NEAL FOWLER.

Witness:
    NOMIE WELSH.